S. WALTMAN.
CULTIVATOR.
APPLICATION FILED APR. 1, 1909.
939,766.
Patented Nov. 9, 1909.
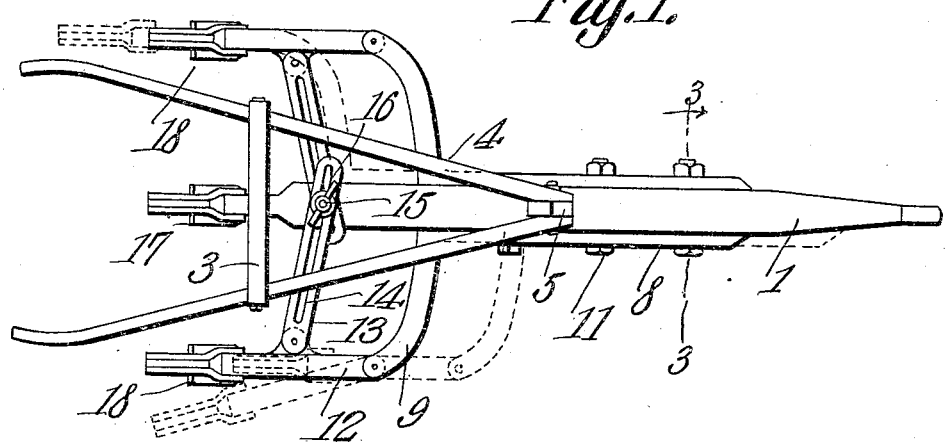
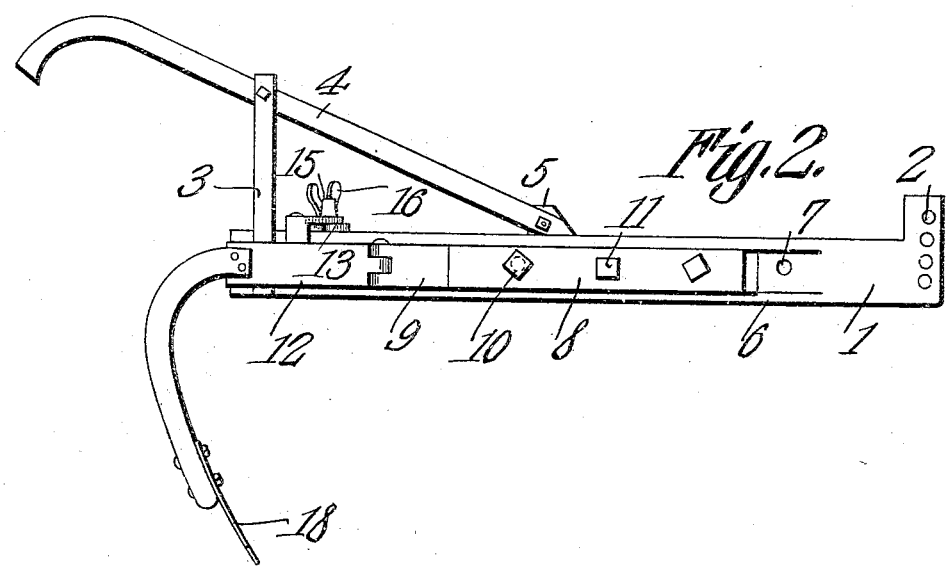
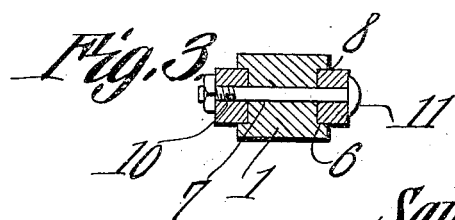
Witnesses
Inventor
Samuel Waltman.
By C. A. Snow & Co.
Attorneys

UNITED STATES PATENT OFFICE.

SAMUEL WALTMAN, OF WESSON, MISSISSIPPI.

CULTIVATOR.

939,766.

Specification of Letters Patent.

Patented Nov. 9, 1909.

Application filed April 1, 1909. Serial No. 487,202.

*To all whom it may concern:*

Be it known that I, SAMUEL WALTMAN, a citizen of the United States, residing at Wesson, in the county of Copiah and State of Mississippi, have invented a new and useful Cultivator, of which the following is a specification.

This invention has relation to cultivators, and it consists in the novel construction and arrangement of its parts, as hereinafter shown and described.

The object of the invention is to provide a cultivator with outrigging wings which may be pitched at a desired angle with relation to the line of draft of the implement, and also provided with an implement of the character indicated for positioning the earth-engaging implement carried by the outrigging wings at variable angles with relation to the earth-engaging member carried by the main beam of the cultivator.

With the above object in view the cultivator comprises a main or central beam, upon which is mounted handles, the said beam being channeled at its sides and provided with transverse perforations. Arms are provided which are adapted to fit snugly in the channels formed at the sides of the primary beam, and the said arms are held in adjusted positions by means of bolts which pass transversely therethrough and through the said beam. Secondary beams are pivotally connected with outer extremities of the said arms, and links are pivotally connected with the said secondary beams and are provided with elongated slots which receive a threaded pin mounted upon the primary beam. A clamping nut is threaded upon the said pin and the said secondary beams carry cultivating blades, and the primary beam also carries a cultivating blade.

In the accompanying drawings:—Figure 1 is a top plan view of the cultivator. Fig. 2 is a side elevation of the same. Fig. 3 is a transverse sectional view of the cultivator, cut on the line 3—3 of Fig. 1.

The cultivator includes a beam 1, which is provided at its forward end with a series of perforations 2, adapted to support a clevis or other means whereby the said beam may be attached to the draft means of a draft animal or draft team. A triangular brace 3 is attached to the rear end of the beam 1, and handles 4 are attached at their forward ends to a lug 5, which is formed upon the upper side of the beam 1 at a point intermediate of its ends, and the said handles 4 are attached at intermediate points to the side portions of the triangular brace 3. The beam 1 is provided at its opposite sides with channels 6, and at points between the ends of the said channels the said beam 1 is provided with transversely disposed perforations 7.

Outrigging arms are provided, to be used in connection with the beam above described, and, inasmuch as the said arms are duplicates one of the other, a description of one will answer for both. Each arm consists of a main or body portion, the inner side of which is adapted to fit snugly within a channel 6, provided at the side of the beam 1, and at its rear end each body portion 8 is provided with an outwardly disposed portion 9. The main or body portions 8 of the arms are provided with perforations 10, which are adapted to register with the perforations 7 transversely disposed in the beam 1. When the perforations 10 of the body portions 8 of the said arms are brought to register with the perforations 7 of the said beam, securing bolts 11 may be passed through the said registering perforations of the several parts, and thus means is provided for fixing the arms with relation to the primary beam 1. Standards 12 are pivotally connected at their forward ends with the outer extremities of the laterally disposed portions 9 of the arms 8, and to each of these standards 12 is pivotally attached the outer end of a link 13. This link 13 is provided with an elongated slot 14, and the slots of the links 13 at the opposite sides of the beam 1 receive a threaded pin 15, which is mounted upon the rear end portion of the said beam 1. A wing-nut 16 is threaded upon the upper portion of the pin 15, and is adapted, when screwed down upon the said pin, to retain the links 13 in fixed relation to the primary beam 1. A shovel plow is carried by the primary beam 1, and shovel plows 18 are carried by the secondary beams 12. By such construction it will be observed that the body portions 8 of the outrigger arms may be shifted and adjusted in positions along the primary beam 1, so that the plow shovels 18 may be positioned at acute angles with relation to the plow shovel 17 and the line of draft of the implement. Also, it will be seen that by moving the links 13 longitudinally and securing the same in adjusted position by tightening the nut 16, the shovels 18 may be pitched at desired angles with relation to the line of draft without considering the shovel 17. Furthermore, it will be seen that when the parts are secured in adjusted positions as indicated they are firmly held in such positions against lateral strain by reason of the fact that the main or body portions of the arms 8 snugly fit within the channels at the sides of the primary beam 1, and also that the central strain upon the links 13 is along the longitudinal dimensions of the said links and is consequently borne in the directions of greatest magnitude.

Having described my invention, what I claim as new, and desire to secure by Letters Patent, is:—

A cultivator comprising a primary beam having at its opposite sides channels and transverse perforations, arms fitting snugly within the channels and having perforations adapted to register with the perforations of the beam, bolts serving in common for securing the arms at the opposite sides of the primary beam in adjusted relation to the primary beam, said arms having outstanding portions, secondary beams pivotally connected with the outstanding portions of the arms, links pivotally connected to the secondary beams, and means for securing the inner end portions of the said links with relation to the primary beam.

In testimony that I claim the foregoing as my own, I have hereto affixed my signature in the presence of two witnesses.

SAMUEL WALTMAN.

Witnesses:
W. L. Wellman,
T. J. Meyer.